United States Patent [19]
Duarte

[11] Patent Number: 5,501,845
[45] Date of Patent: Mar. 26, 1996

[54] CHILLED OXYGEN FOR AN IONIZATION DEVICE

[76] Inventor: Fernando C. Duarte, 275 Orange Ave., #127A, Chula Vista, Calif. 91911

[21] Appl. No.: 474,467

[22] Filed: Mar. 10, 1995

Related U.S. Application Data

[63] Continuation of Ser. No. 239,986, May 9, 1994, abandoned.

[51] Int. Cl.[6] ................................................. B01J 19/18
[52] U.S. Cl. .............................. 422/186.19; 422/186.18; 422/907
[58] Field of Search .................... 422/186.07, 186.18, 422/186.19, 907

[56] References Cited

U.S. PATENT DOCUMENTS

| | | | |
|---|---|---|---|
| 4,025,441 | 5/1977 | Tabata | 250/540 |
| 4,619,763 | 10/1986 | O'Brien | 210/177 |
| 4,690,803 | 9/1987 | Hirth | 422/186.18 |
| 4,693,870 | 9/1987 | Gloor et al. | 422/186.19 |
| 4,724,062 | 9/1988 | Heineman | 422/186.18 |
| 4,774,062 | 9/1988 | Hainemann | 422/186.19 |
| 5,002,739 | 3/1991 | Ditzler | 422/186.19 |
| 5,008,087 | 4/1991 | Batchelor | 422/186.22 |
| 5,038,852 | 9/1991 | Johnson et al. | 165/12 |

OTHER PUBLICATIONS

Dimitriou, M. A., "Design Guidance Manual for Ozone Systems", 1990, pp. 16–45, 56–67.

*Primary Examiner*—Donald P. Walsh
*Assistant Examiner*—Daniel Jenkins

[57] ABSTRACT

A method is disclosed of improving the output of ozone, as well as operating functions of a silent-discharge-type-ozonizer, by pre-conditioning oxygen as a feed gas prior to its introduction in and through the ozonizer.

2 Claims, 1 Drawing Sheet

CHILLED OXYGEN FOR AN IONIZATION DEVICE

This is a continuation of Ser. No. 239,986, filed May 9, 1994, abandoned.

BACKGROUND OF INVENTION

1. Field of Invention

The present invention relates to the use of controlled pre-conditioned oxygen as a feed gas in the production of ozone.

2. Description of Prior Art

It is generally known that corona silent discharge generators may be used to induce a variety of chemical reactions. In particular, corona discharge generators have long been used to produce ozone from oxygen. The volume of ozone produced by a given generator will depend upon the particular variable factors such as; oxygen concentrations, electrical power, applied feed gas flow, frequency, and, most of all, temperature. It is common knowledge that the reaction that takes place in the conversion of the oxygen molecules to ozone atoms within the corona-producing-chamber is the source of the destructive heat. Thus, it is extremely critical the reactant gas temperature be maintained as low as possible so as to inhibit the decomposition of ozone and to maintain a reasonable dielectric life.

Batchelor, U.S. Pat. No. 5,008,087, dated Apr. 16, 1991, describes a method of using a gas, such as air, as a means of cooling the corona discharge device. These teachings make no mention of pre-conditioning the gas, prior to entering the ozone producing chamber, as a result gas entering at ambient temperature would prevent the assurance of a constant ozone output, regardless of ambient temperature. Further, as stated by Batchelor, the gas would pass through the annular inner gap between the inner electrode and the dielectric member, and return, so as to pass through and between the outer electrode and the dielectric. Batchelor thus fails to recognize the affect of such a passage on the development of, and build up of heat in the chamber producing ozone, and leading to decomposition of the ozone. Whereas calculated a pre-conditioning of said feed gas does insure constant results, eliminating this weakness.

Tabata, U.S. Pat. No. 4,025,441 dated May 24, 1977, teaches the application of a means for chilling and thereafter, drying the ambient air, prior to its being passed through the ozone generator. Whereas the process should be reversed; first, dry and then chill, to a temperature below freezing. In this way one would guarantee a stable ozone output.

O'Brien, U.S. Pat. No. 4,619,763 dated Oct. 28, 1986, teaches the use of ambient air, as a feed gas and a coolant instead of oxygen freed of moisture and nitrogen, pre-conditioned to enter the ozone generator at 10 degrees F. or below and to exit at 50 degrees F. or below, without freezing. The pre-conditioning of the oxygen as a feed gas to a temperature of 10 degrees F. or below would protect the life of the dielectric and insure against decomposition of the ozone, with a guaranteed control of temperature at the source of the heat. O'Brian's teachings of using ambient air to cool the inner parts of the dielectric fails to consider the wide variation in temperature of ambient air depending on where in the world one might use an ozone generator. By pre-conditioning oxygen as a feed gas to a very low temperature would allow one to control the temperature of the ozone as it is formed and the dielectric would thus never acquire any heat. Klaus W. Heineman, U.S. Pat. No. 4,724,062, dated Sep. 27, 1988, claims the use of a liquid coolant, maintained at a temperature of 38 decrees C. This solution entails a method of pre-cooling a liquid, pumped through a chamber adjoining the ozone-producing reaction chamber and insuring against any direct contact with the incorporated high-voltage. No coolant or method of cooling describes direct contact with the feed-gas.

Lee C. Ditzler, U.S. Pat. No. 5,002,739, dated Mar. 26, 1991, Ditzler describes "a coolant fluid such as water, is passed through the outer annular passage." Diztler also claims the construction of the device contains; an inner cylinder, an intermediate-cylinder and an outer cylinder. The fluid used to provide a cooling media must be pre-conditioned and then introduced into a relatively complex system, in order to provide the required temperature. The method described has no direct contact with the feed gas before or during its ozone producing stage.

Johnson et al, U.S. Pat. No. 5,038,852, dated Aug. 13, 1991, teaches that a solid-state thermo-heat-pump can be used to cool a structure without the use of cooling fluid. However, the Johnson et al purpose is not to cool a structure which, in itself, is a conductor of fluid that is introduced into the machined channels of the structure, in order to heat and then cool said fluid. Nor that said cooled fluid is used to support another said structure beyond. As a result of an increasing demand for solutions to a wide variety of problems of which ozone is one solution, various generations of ozone related equipment are being developed. The reason for this demand are based upon the characteristics of ozone; powerful, versatile and mostly short lived. The initial evolutionary change was the development of a family of small, point of use generators using the proven conventional methods.

The early power supply for ozone silent corona discharge generators was an A C current with a 50 or 60 Hz transformer, representing no electrical flexibility. From there the need for better performance forced the development of an electronic, solid state power supply. This system resulted in a higher-frequency, field-enhancement, higher-voltage, and lower electrical consumption cost, as well as more corona and more ozone. The negative was the production of increased dielectric stress with heat, transformer-stress with heat and subsequent decomposition of the ozone produced because of excess heat. The solution was to develop an effective and improved design providing a method of high electrical field enhancement, without the heat producing high-voltage. The results were, with field excitation, less voltage required, therefore, less transformer breakdown, with the same ozone-output. The next stage was to finding the precise frequency beyond 60 Hz which would allow for a smaller transformer, lower voltage greater production of corona. Finally, it was necessary to find the optimum frequency. Further more, and most important, was the development of a method for cooling the corona producing chamber preventing the destructive heat.

SUMMARY OF INVENTION

The general object of this invention is to provide improved ozonizers distinguishable from prior, related, devices by their increased efficiency. A specific objective of this invention is: to provide ozonizers which produce comparatively high concentrations of ozone per unit. A Further objective of this invention is: to provide ozonizers which require less maintenance and repair. In accordance with this invention these objectives are achieved. Such improved ozonizers, in which two electrodes are separated by a dielectric and in which oxygen is passed between the electrodes of opposite charge to cause the production of ozone. In such an ozonizer it is preferred that these electrodes and the dielectric, are all cylindrical and are so arranged as to create a cylindrical-channel. In this construction, an inlet and an outlet are provided, so as to allow the passage of pre-conditioned oxygen through the channel between the electrode and the dielectric.

BRIEF DESCRIPTION OF THE DRAWING

Further details of this invention, as well as many advantages of it, will be apparent from a detailed consideration of the remainder of this specification, the appended claims and the accompanying drawings in which;

It will be realized that this invention is not to be limited by the above drawings and the following description of a presently preferred embodiment or form of an ozonizer, of this invention. Those skilled in the design and construction of ozonizers realize that features, or principles embodied in the specific ozonizer shown, may be easily and conveniently embodied within differently constructed ozonizers through the use or exercise of routine engineering skill.

DESCRIPTION OF THE PREFERRED EMBODIMENT

Figure 1:
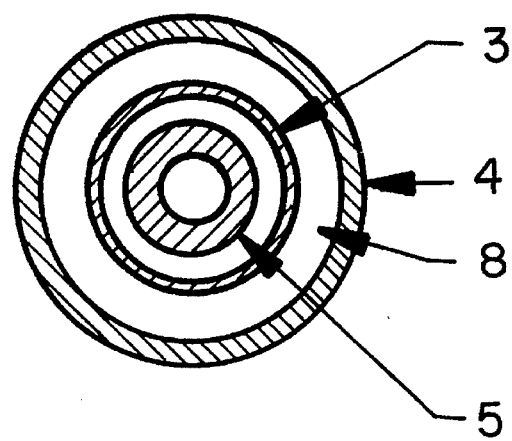
FIG. 1 is a frontal view of the form of the corona discharge construction, indicating the relationship between the electrodes and the dielectric and the feed gas passage.
Figure 2:
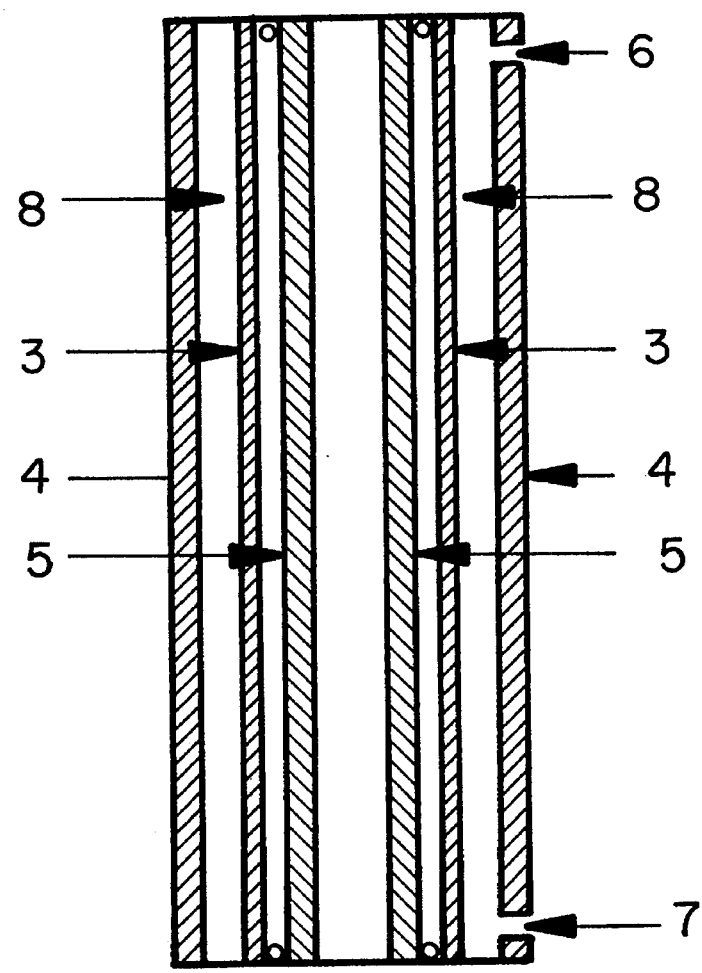
FIG. 2 is a cross section view of this ozonizer.

In the drawing there is shown the form of an ozonizer, FIG. 1 and FIG. 2 of this invention. This particular ozonizer FIGS. 1 and 2 is of a so called "silent" type, inasmuch as it includes a dielectric #3 located between the facing electrodes #4 and #5 respectively. The nature of the dielectric tube #3 is considered to be especially important, achieving preferred results with the present invention. The dielectric is the most vulnerable part of the reaction chamber. A preferred embodiment is to protect and extend, the life and perfect functioning of said electrode, by controlled calculated cooling.

The length of the chamber beginning with #6 and ending with #7 of FIG. 2, also, is considered to be important. The length is such that the distance from the inlet to the outlet is only long enough, based on the temperature of the feed gas at inlet, to reach only 50 degrees F. or less at outlet.

The particular dielectric tube #3 is a cylindrical tube, made of a material capable of passing at least some radiation generated within the complete ozonizer, FIGS. 1 and 2, during the operation of this device. It is preferred to form this particular tube out of a borosilicate glass or quartz, each having a comparatively low temperature-coefficient-of-expansion and a relatively high mechanical strength. By virtue of such a low coefficient-of-thermal-expansion, and the high mechanical strength, such a glass performs satisfactorily in the complete ozonizer FIGS. 1 and 2. By including an additional condition of chilled oxygen feed gas through the ozone producing chambers #6 & #7, where the heat is actually generated, the temperature can be controlled and predicted. Calculating the distance that the feed gas must travel in its journey through the chambers #6 to #7, will insure that the temperature never rises any higher than a limited amount. The ozone producing path #6 to #7 is where the activity of creation of ozone occurs. The reaction of creating ozone is the source of heat and the heat is the cause of the dielectric failure as well as the decomposition of the desired ozone. The heat is transmitted throughout the ozonizer FIGS. 1 and 2 and beyond. By dealing with the heat directly at its source within the heat-generating-reactor the heat is never allowed to accumulate beyond a safe level. A preferred embodiment of this invention is to cool the oxygen feed gas down to 10 degrees F. or below, together with a given voltage, frequency and ozonizing-chamber-length allows an output temperature of 50 degrees F. or below, of the resulting ozone production. The characteristics of #6 and #7 of FIG. 2 referred to as the inlet and outlet #6 through #7 are interchangeable e.g. either #6 or #7 can be the inlet and either #7 or #6 can be the outlet of the feed gas in and ozone out. The preferred embodiment described above e.g. the continuous chilling of the oxygen prior to introducing the chilled oxygen into the ozonizer insures that no heat beyond the actual heat created in the generating of ozone is produced.

With a preferred ozonizer, FIGS. 1 and 2 of this invention the entire ozone producing chamber #6 thru #7 is bathed continuously in oxygen flow, thus absorbing the heat resulting from the molecular reaction of ozone generation within the chamber. The heat is disposed of, or absorbed, by the continuous heat-transfer from the heat source to the exposed surfaces of the dielectric, the electrode and beyond. The distance from the point of entry of the oxygen feed-gas, through the reaction chamber, to the point of exit of the now-generated-ozone, is calculated to be exactly long enough to insure 10 degrees F. or below at entry and a temperature of 50 degrees F. or below as ozone laden oxygen at the point of exit. The advantages of the preferred ozonizer described extend, beyond the value of dielectric stability and more ozone output, resulting from less heat and less ozone decomposition, it also insures that the more stable ozone enjoys a longer half-life and therefore, a more effective ozone, because of its greater solubility in a contaminated liquid at lower temperatures. When the ozonizer is operated in a preferred manner the precise voltage applied should be sufficiently high so that the entire interior of the ozonizer #6 through #7 will assume on a bluish type appearance because of radiation generation without any arcing taking place between the electrodes #4 and #5. Under the usual conditions, the voltage used must be below that at which physical breakdown will take place in the dielectric. With the preferred embodiment described herein, a higher voltage is possible, with a higher ozone concentration resulting. There are a number of other factors to consider: including the physical dimension of the precise ozonizer gap #8, the temperature of the chamber; control of dielectric and electrode; and the critical factor is determining how high the voltage can be raised. With all factors equal, the voltage is directly proportional to the volume of ozone produced. The raising of the voltage beyond a given point is, also, directly proportional to the temperature of the reactor chamber.

The overall efficiency of the ozonizer is considered to be related to virtually every facet of its construction. The ozonizer described is constructed so that the possibility of physical breakdown within the device is effectively minimized. The volume and pressure of the flow of feed gas, the gap of the feed-gas path, the length of the chamber from entry to exit, the dielectric and electrode material and shape, and the voltage frequency are manipulatable. However, conventional or known methods of cooling are generally ineffective and require cumbersome design changes to the corona-discharge-assembly. Which can decrease its efficiency and flexibility. However, to bring the temperature of the chamber down to 10 degrees F. at a constant temperature of no more than 55 degrees F. allows the design of the inter-related ozonizer components leading to optimum performance and therefore, the ozone output of the device that the components support.

It is of course, to be recognized that another ozonizer can be used with other than pure or near pure oxygen as a feed gas in the production of ozone. However, an alternate source of a feed-gas, containing oxygen must be free of all moisture, otherwise, at the preferred temperatures of 10 degrees F. or below the feed-gas will freeze, rendering the reactor inoperable.

What is claimed and desired to be secured by Letters Patent of the United States

1. An ozonizer comprising an inner tubular electrode positioned concentrically within an outer tubular electrode, and a dielectric tube concentrically located between the inner and outer electrodes forming an annular passage between one or both of the electrodes and the dielectric tube, an electric power source connected to the inner and outer electrodes, a means to supply substantially pure oxygen to the annular passage, said oxygen being pre-conditioned to a temperature of 10° F. or less before entering the ozonizer.

2. An ozonizer as in claim 1, further comprising an inlet means tangential to said annular passage for providing said oxygen to the annular passage, an outlet means tangential to said annular passage for removing said treated gas, wherein the length of the annular passage and the means for supplying said oxygen are such that the treated gas exits the ozonizer at not more than 50° F.

\* \* \* \* \*